(12) United States Patent
Doran et al.

(10) Patent No.: US 8,548,338 B2
(45) Date of Patent: Oct. 1, 2013

(54) METHOD AND SYSTEM FOR DEPLOYING AN OPTICAL DEMODULATOR ARRANGEMENT IN A COMMUNICATIONS NETWORK

(75) Inventors: Nicholas John Doran, Stratford-on-Avon (GB); Donald Scott Govan, Swansea (GB); Brian Garrett, Newton Abbott (GB)

(73) Assignee: Oclaro Technology Limited, Towcester (GB)

( * ) Notice: Subject to any disclaimer, the term of this patent is extended or adjusted under 35 U.S.C. 154(b) by 365 days.

(21) Appl. No.: 12/906,554

(22) Filed: Oct. 18, 2010

(65) Prior Publication Data

US 2011/0091204 A1    Apr. 21, 2011

Related U.S. Application Data

(60) Provisional application No. 61/252,374, filed on Oct. 16, 2009.

(51) Int. Cl.
*H04B 10/06* (2006.01)

(52) U.S. Cl.
USPC ............................. 398/212; 398/161; 398/208

(58) Field of Classification Search
USPC .................................. 398/161, 213, 208, 212
See application file for complete search history.

(56) References Cited

U.S. PATENT DOCUMENTS

| | | | |
|---|---|---|---|
| 7,389,055 B1 | 6/2008 | Rickard et al. | |
| 7,546,041 B2 | 6/2009 | Griffin | |
| 2009/0190924 A1* | 7/2009 | Snawerdt et al. | 398/33 |
| 2009/0245785 A1* | 10/2009 | Asano et al. | 398/25 |

FOREIGN PATENT DOCUMENTS

| | | |
|---|---|---|
| EP | 2 019 498 A1 | 1/2009 |
| EP | 2 051 414 A1 | 4/2009 |
| EP | 2 106 042 A1 | 9/2009 |

OTHER PUBLICATIONS

Chandrasekhar, S., et al., "Impact of Channel Plan and Dispersion Map on Hybrid DWDM Transmission of 42.7-Gb/s DQPSK and 10.7-Gb/s OOK on 50-GHz Grid," IEEE Photonics Technology Letters, vol. 19, No. 22, pp. 1801-1803, Nov. 15, 2007.
Gnauck, A.H., et al., "Hybrid 10/40-G Transmission on a 50-GHz Grid Through 2800 km of SSMF and Seven Optical Add-Drops," IEEE Photonics Technology Letters, vol. 17, No. 10, pp. 2203-2205, Oct. 2005.
Govan, D.S., et al., "An RZ DPSK receiver design with significantly improved dispersion tolerance," Optics Express, vol. 15, No. 25, pp. 16916-16921, Dec. 10, 2007.

(Continued)

*Primary Examiner* — Leslie Pascal
(74) *Attorney, Agent, or Firm* — Fenwick & West LLP

(57) ABSTRACT

The present application describes methods and systems for use in a communications network. More specifically, a method of deploying an optical demodulator arrangement having at least one interferometer in a network that transmits an optical signal is provided. The optical signal may include one or more on-off-keyed signals and one or more DMPSK signals. In some embodiments, the DMPSK signal is a DQPSK signal. The network may include one or more of fiber spans carrying the signals. The interferometer may have a first optical path and a second optical path and a time delay is formed between the first and second optical paths. The method may involve determining a cross-talk penalty that results from cross-phase modulation between the channels, and determining a time delay value for the interferometer. The time delay value may be determined based at least in part on determined the cross-talk penalty.

35 Claims, 11 Drawing Sheets

(56) References Cited

OTHER PUBLICATIONS

Griffin, R.A., et al., "Optical Differential Quadrature Phase-Shift Key (oDQPSK) for High Capacity Optical Transmission," in the Proceedings of Optical Fiber Communications Conference and Exhibit (OFC), Paper WX6, pp. 367-368, Mar. 17-22, 2002.

Ito, T., et al., "Study of 10G/40G Hybrid Ultra Long Haul Transmission Systems with Reconfigurable OADMs for Efficient Wavelength Usage," in the 28$^{th}$ European Conference on Optical Communication, vol. 1, pp. 1-2, Sep. 8-12, 2002.

Mikhailov, V., et al., "Experimental investigation of partial demodulation of 85.3 Gb/s DQPSK signals," in the 34$^{th}$ European Conference on Optical Communication, pp. 1-2, Sep. 21-25, 2008.

Mikkelsen, B., et al., "Partial DPSK with excellent filter tolerance and Osnr sensitivity," Electronics Letters, vol. 42, No. 23, pp. 1363-1364, Nov. 9, 2006.

Patent Cooperation Treaty, International Search Report, International Patent Application No. PCT/IB2010/002829, Mailed Mar. 28, 2011, 3 pages.

Patent Cooperation Treaty, Written Opinion of the International Searching Authority, International Patent Application No. PCT/IB2010/002829, Mailed Mar. 28, 2011, 5 pages.

Rohde, M., et al., "Robustness of DPSK direct detection transmission format in standard fibre WDM systems," Electronic Letters, vol. 36, No. 17, pp. 1483-1484, Aug. 17, 2000.

Wernz, H., et al., "Nonlinear Behaviour of 112, Gb/s Polarisation-Multiplexed RZ-DPQSK with Direct Detection in a 630 km Filed Trial," in the 35$^{th}$ European Conference on Optical Communication, pp. 1-2, Sep. 20-24, 2009.

Yamazaki, S., et al., "Feasibility Study on QPSK Optical-Heterodyne Detection System," Journal of Lightwave Technology, vol. 8, No. 11, pp. 1646-1653, Nov. 1990.

\* cited by examiner

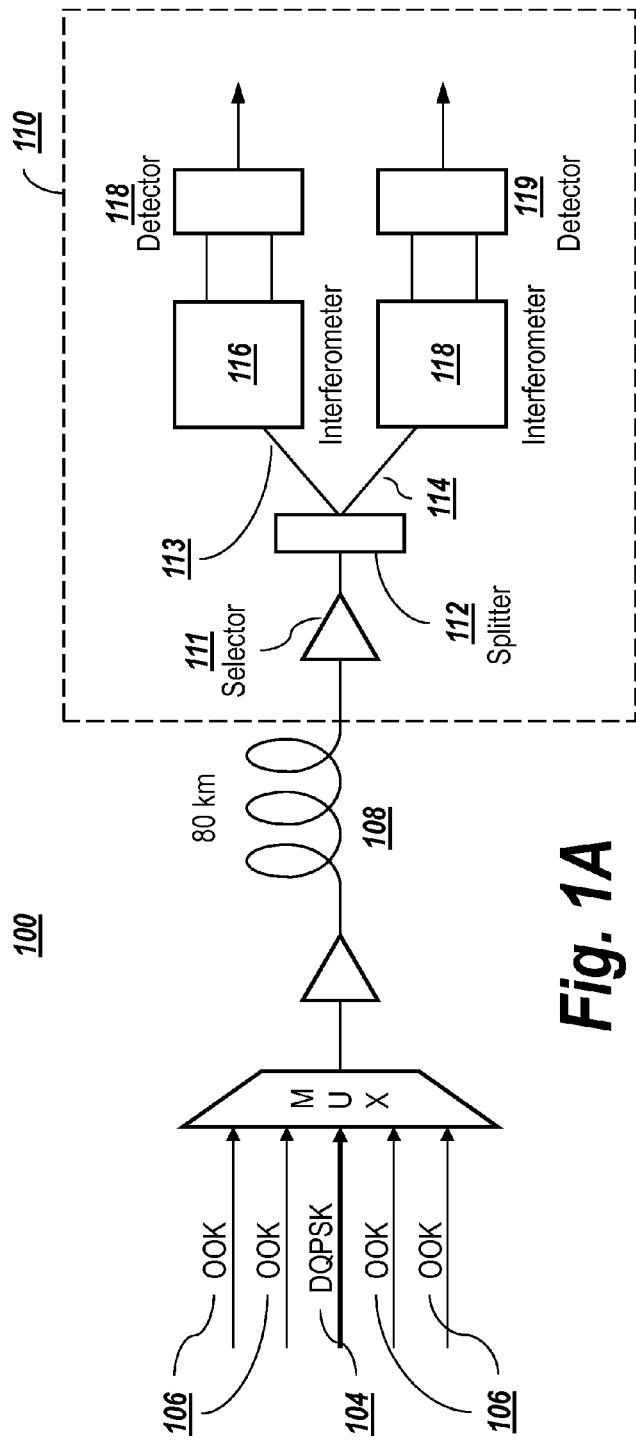
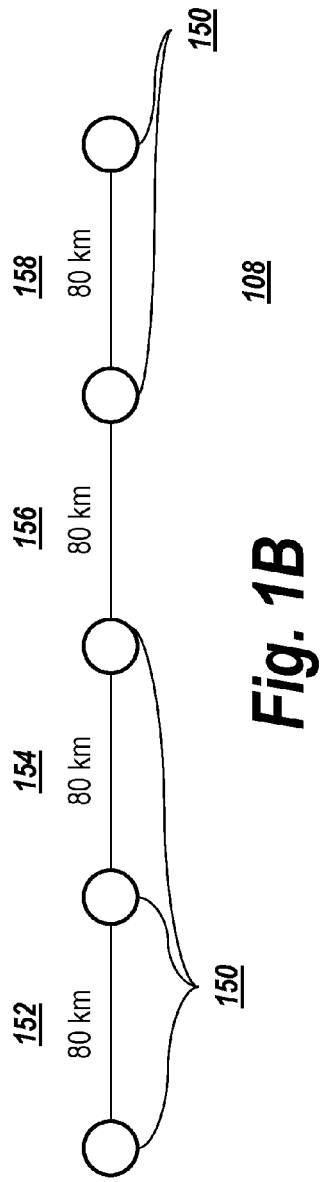
Fig. 1A
Fig. 1B

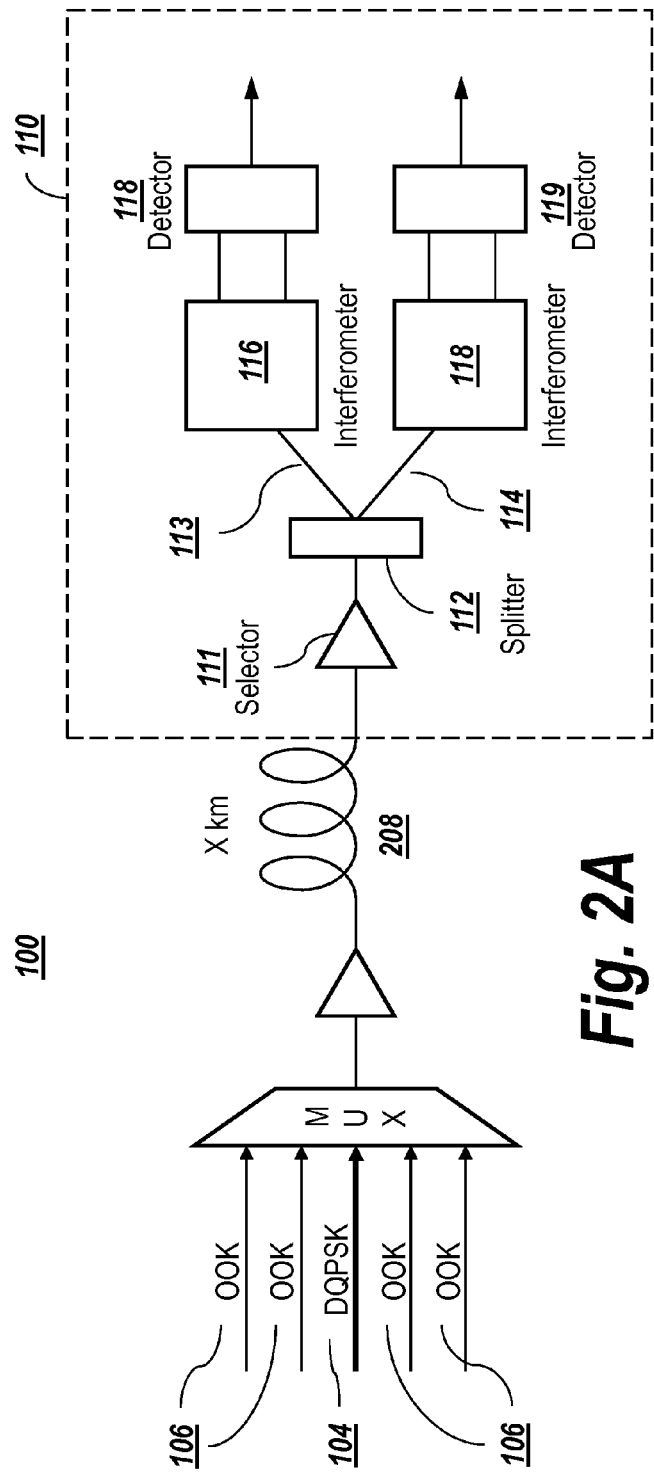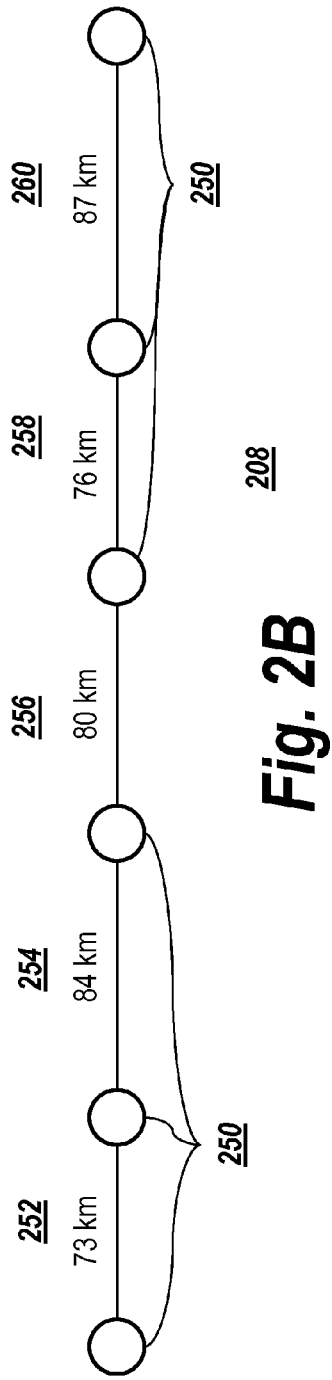

METHOD AND SYSTEM FOR DEPLOYING AN OPTICAL DEMODULATOR ARRANGEMENT IN A COMMUNICATIONS NETWORK

RELATED APPLICATIONS

This application claims priority to U.S. Provisional Patent Application Ser. No. 61/252,374, filed on Oct. 16, 2009. This application is further related to U.S. patent application Ser. No. 10/451,464, filed Dec. 2, 2003, now U.S. Pat. No. 7,546,041, issued on Jun. 9, 2009. The contents of the aforementioned applications are incorporated herein by reference.

BACKGROUND

This invention generally relates to optical communications, and in particular to a method and system for demodulating an optical carrier in an optical communications network.

The backbone of point-to-point information transmission networks is a system of optically amplified dense wavelength division multiplex (DWDM) optical links. Due to the increase in bit rate applied to each wavelength of a multiplexed signal, and the simultaneous increase in the number of channels, the finite width of the erbium gain window of conventional erbium-doped optical amplifiers (EDFAs) could become a significant obstacle to further increases in capacity. Conventional EDFAs have a 35 nm gain bandwidth which corresponds to a spectral width of 4.4 THz. System demonstrations of several Tbit/s are already a reality and the spectral efficiency, characterized by the value of bit/s/Hz transmitted, is becoming an important consideration. Currently, high-speed optical transmission employs binary amplitude keying, using either non-return-to-zero (NRZ) or return-to-zero (RZ) signaling formats, in which data is transmitted in the form of optical pulses having a single symbol level.

One technique which has been proposed which allows an improvement of spectral efficiency is the use of quaternary phase shift keying (QPSK) [S. Yamazaki and K. Emura, (1990) "Feasibility study on QPSK optical heterodyne detection system", J. Lightwave Technol., vol. 8, pp. 1646-1653]. In optical QPSK the phase of light generated by a transmitter laser is modulated either using a single phase modulator (PM) driven by a four-level electrical signal to generate phase shifts of $0$, $\pi/2$, $\pi$ or $3\pi/2$ representative of the four data states, or using two concatenated phase modulators which generate phase shifts of $0$ or $\pi/2$ and $\pi$ or $3\pi/2$ respectively. A particular disadvantage of QPSK is that demodulation requires, at the demodulator, a local laser which is optically phase-locked to the transmitter laser. Typically this requires a carrier phase recovery system. For a WDM system a phase-locked laser will be required for each wavelength channel. It further requires adaptive polarization control which, in conjunction with a phase recovery system, represents a very high degree of complexity. Furthermore, systems that require a coherent local laser are sensitive to cross-phase modulation (XPM) in the optical fiber induced by the optical Kerr non-linearity, which severely restricts the application to high capacity DWDM transmission.

It has also been proposed to use differential binary phase shift keying (DBPSK) [M. Rohde et al (2000) "Robustness of DPSK direct detection transmission format in standard fiber WDM systems", Electron. Lett., vol. 36]. In DBPSK, data is encoded in the form of phase transitions of $0$ or $\pi$, in which the phase value depends upon the phase of the carrier during the preceding symbol interval. A Mach-Zehnder interferometer with a delay in one optical path equal to the symbol period is conventionally used to demodulate the optical signal. Although DBPSK does not require a phase-locked laser at the receiver, it does not provide any significant advantages compared to conventional amplitude NRZ signaling.

Differential quadrature phase shift keying (DQPSK) is a popular format for upgrading installed links to 40 Gb/s, due to its spectral efficiency and tolerance to chromatic and polarization mode dispersion. However it has been shown that there can be significant penalties as a result of XPM when DQPSK channels are transmitted alongside 10 Gb/s on-off-keyed (OOK) channels.

XPM causes a penalty in DQPSK channels because of random variations in the intensity of the OOK channels (due to the random nature of the data). This results in phase noise on the DQPSK channels which is translated to intensity noise and therefore errors when the signal is demodulated at the receiver.

The XPM penalty can be reduced by using both a high local and average dispersion or narrow filtering; however, when upgrading installed systems both the filtering and the dispersion are generally fixed before the upgrade takes place and so cannot be changed without interrupting service. The XPM penalty can also be reduced by controlling power of both the DQPSK and the OOK channels; however, in the case of the OOK channels this has been previously set to give the required performance and so cannot necessarily be easily changed while maintaining the performance of those channels.

SUMMARY

The present application describes methods and systems for reducing a cross-talk penalty resulting from cross-phase modulation in a communications network. More specifically, a method of deploying an optical demodulator arrangement having at least one interferometer in a network is provided.

An optical signal may be transmitted in the network, and may include multiple multiplexed signals including one or more OOK signals and one or more DMPSK signals. In some embodiments, the DMPSK signal is a DQPSK signal. The network may include one or more of fiber spans carrying the signals. The interferometer may have a first optical path and a second optical path and a time delay is formed between the first and second optical paths.

Conventional interferometers include a time delay in order to determine the amount that a particular signal has been phase shifted. Conventionally, the time delay may be set to (for example) one symbol period in order to aid in the interpretation of the phase shifted signal. However, the inventors have discovered that, unexpectedly, the time delay may also be leveraged to reduce the cross-talk penalty associated with cross-phase modulation in the modulated signal. More specifically, by selecting a time delay value appropriate to the amount of dispersion and/or predispersion in the network, the cross-talk penalty can be significantly reduced.

The inventive method may involve determining a cross-talk penalty that results from cross-phase modulation between the channels, and determining a time delay value for the interferometer. The time delay value may be determined based at least in part on determined the cross-talk penalty.

In order to determine the cross-talk penalty, a dispersion map of the network may be calculated, provided, or otherwise determined. The dispersion map may describe the lengths of one or more of the plurality of fiber spans, and/or may describe the variability in the lengths of two or more fiber spans. The cross-talk penalty may be calculated based on the dispersion map; for example based on the lengths of two or more of the fiber spans, or based on the variability between the fiber spans. The time delay value may be calculated to be larger as the lengths of the fiber spans become more irregular.

The cross-talk penalty may be determined based at least in part on a residual dispersion per span associated with each of the plurality of fiber spans, or based on an average residual dispersion per span in the network as a whole. The cross-talk penalty may also be determined based on the Nett dispersion in the network.

In some embodiments, the optical signal is subjected to pre-dispersion, and the cross-talk penalty includes an amount of pre-dispersion in the optical signal. Determining the time delay value for the interferometers may include determining the amount of pre-dispersion in the optical signal, and determining the time delay based at least in part on the amount of pre-dispersion in the optical signal.

In some embodiments, the time delay value may be adjustable by adjusting the length of one or more of the first and second optical paths of the interferometer, relative to each other. In some embodiments, a parameter of the optical path may be adjusted in order to adjust the time delay value. For example, a property of the optical medium carrying an optical signal in one of the interferometer optical paths may be adjusted (e.g., changing the medium from empty space to glass).

An optical demodulator arrangement for demodulating a modulated optical signal is also described herein. The modulated optical signal may include one or more signals, and may be transmitted in a network comprising a number of fiber spans, each having a length.

The optical demodulator arrangement may include a splitter for splitting the modulated optical signal into first and second signal components, a first interferometer having first and second optical paths and being coupled to receive the first signal component, and a second interferometer having first and second optical paths and being coupled to receive the second signal component. Each of the first and second interferometers may have a time delay of less than one symbol period between the first and second optical paths, and a value of the time delay may be determined based on at least a cross-talk penalty that results from cross-phase modulation between the plurality of channels.

The system may further include a processor for determining the value of the time delay and/or the crosstalk penalty, and an adjustor for changing the distance between the optical paths of the interferometer based on the delay value calculated by the processor.

The system may further include one or more phase shifters coupled to at least one of the optical paths of the first or second interferometer, the phase shifters shifting the phase of the corresponding signal component. One of the interferometers may have a relative phase shift of $\pi/4$ radians between the two optical paths, and the other interferometer may have a relative phase shift of $-\pi/4$ radians between the two optical paths.

The system may further include first and second balanced detectors for receiving the respective outputs of the first and second interferometers.

Using the methods and systems described herein, a cross-talk penalty associated with cross-phase modulation in the optical signal can be significantly reduced. The result is a clearer signal that can be transmitted over longer distances.

BRIEF DESCRIPTION OF THE DRAWINGS

FIG. 1A is a block-diagram overview of a system including a demodulator according to an exemplary embodiment having a regular span length.

FIG. 1B depicts the span lengths between nodes in the communications network depicted in FIG. 1A.

FIG. 2A is a block-diagram description of a high-level overview of a system including a demodulator according to an exemplary embodiment having an irregular span length.

FIG. 2B depicts the span lengths between nodes in the communications network depicted in FIG. 2A.

DETAILED DESCRIPTION

Figure 3:
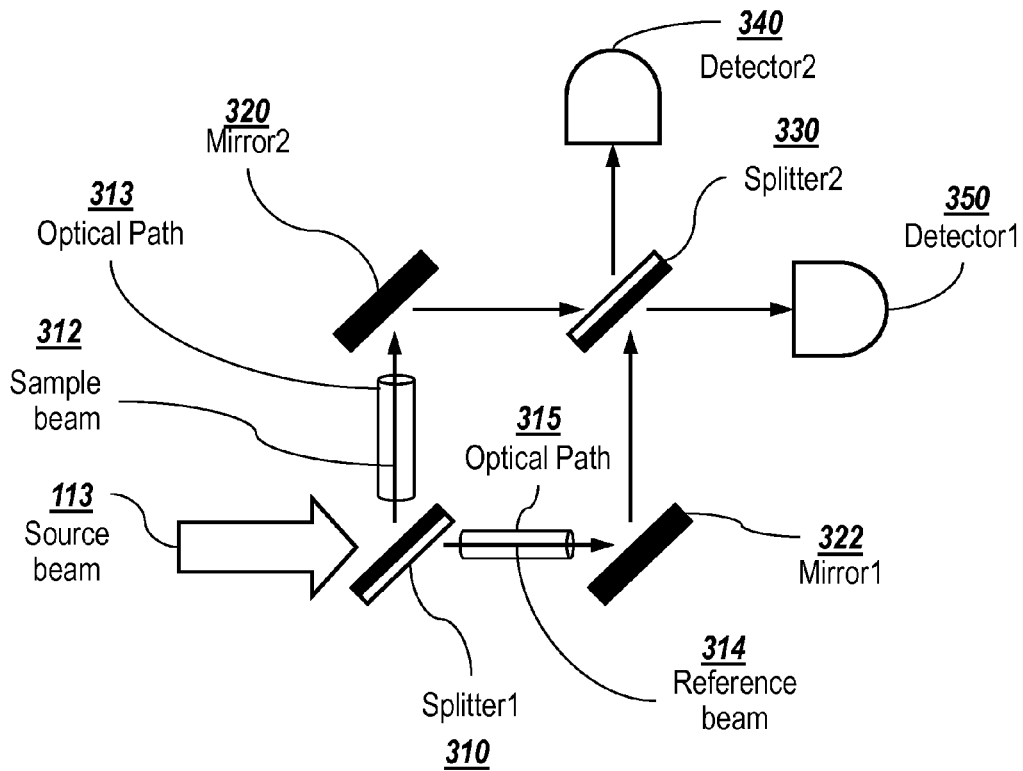
FIG. 3 is an example of an interferometer.

Using the methods and systems described herein, the cross-talk penalty associated with cross-phase modulation in an optical network can be reduced. This allows more signals to be carried at greater speed in the network. The inventive methods and systems modify or select a time delay value in one or more optical paths of an interferometer in a demodulator arrangement in order to compensate for the cross-talk penalty.

FIG. 1A is a block-diagram description of a high-level overview of a system 100 including a demodulator 110 according to an exemplary embodiment of the present invention. The demodulator 110 may include a selector 111 for receiving an incoming modulated optical signal 102. The incoming signal 102 may include two or more signals, such as a differential quadrature phase-shift keyed (DQPSK) signal 104 and one or more on-off-keyed (OOK) signals 106. Two or more of the signals may be "neighboring" signals—for example, the signals may be multiplexed using wavelength division multiplexing (WDM), and two neighboring signals may have relatively similar wavelengths. By multiplexing the signals 104, 106 together, more information can be carried in network 108. However, multiplexing the signals 104, 106 may result in cross-phase modulation (XPM) where two neighboring signals interfere with each other's phases.

The selector 111 may select one of the signals, for example the DQPSK signal 104. The selector may select the signal, for example, by isolating a particular wavelength carrying the DQPSK signal 104. Accordingly, the selector 111 may be a demultiplexer.

The demodulator further includes a splitter 112 for splitting the DQPSK signal 104 into two or more signal components 113, 114. The first signal component 113 is received at a first interferometer 116, and the second signal component 114 is received at a second interferometer 118. In operation, the interferometers 116, 118 shift the phase of the incoming signals. For example, in a DQPSK system, the interferometers 116, 118 may shift the phase of the incoming signals relative to each other by $\pi/2$. To achieve such a shift, for example, the first interferometer 116 may shift the phase of the signal by $\pi/4$, and the second interferometer 118 may shift the phase of the signal by $-\pi/4$.

The interferometers 116, 118 are used to analyze and/or demodulate the incoming modulated optical signal 102, and provide their outputs to one or more detectors 117, 119. The interferometers 116, 118 are described in more detail below with reference to FIGS. 3 and 4.

The network 108 of FIG. 1A is depicted in more detail in FIG. 1B. The network 108 is associated with one or more nodes 150. The nodes 150 may be, for example, optical amplifiers or repeaters for amplifying or copying an incoming optical signal and forwarding the signal to the next node 150. Some processing may be performed on the nodes 150. The nodes 150 may or may not include a demodulator arrangement 110.

As can be seen in FIG. 1B, the network 108 has a regular span length. A "span" may include the fiber connecting two or more nodes 150 and any dispersion compensating modules between a pair of optical amplifiers.

In FIG. 1B, the distances 152, 154, 156, 158 between adjacent nodes 150 in each case is 80 km. The regularity or variability of the span lengths may be determined, for example, by calculating a value $\sigma$, which represents the standard deviation in span length for nodes 150 in a particular area of the network, or in the network as a whole. Alternatively, the $\sigma$ value may simply be a relative measure of the variability in the network (for example, $\sigma$ may be +/-5 km to indicate that the span lengths vary from each other by up to five kilometers). In FIG. 1B, the $\sigma$ value is +/-0, because all the span lengths 152, 154, 156, 158 are 80 km.

FIG. 2A is a block-diagram description of a high-level overview of the system 100 including the demodulator 110 in a network 208 with an irregular span length. FIG. 2B depicts the span lengths between nodes in the communications network depicted in FIG. 2A. As shown in FIGS. 2A and 2B, the network 208 includes a number of nodes 250. The nodes are separated by irregular span lengths 252, 254, 256, 258, 260. In the case of FIG. 2B, the value for $\sigma$ is +/-7 km.

FIG. 3 is an example of an interferometer, such as (for example) interferometer 116. The interferometer 116 may be, for example, an unbalanced Mach-Zehnder interferometer (MZI) which receives one of the signal components 113 from the splitter 112. The interferometer 116 may be fabricated, for example, in gallium arsenide or lithium niobate.

The interferometer 116 may include a splitter 310 for splitting the received signal component 113 into two or more interferometer signal components 312, 314. The first interferometer signal component 312 is referred to as the sample beam, and is provided to a mirror 320 along an optical path 313. Likewise, a reference beam 314 is supplied to a second minor 322 along a second optical path 315. The optical paths 313, 315 may be defined with respect to only a portion of the distance traveled by the split interferometer signal components 312, 314, as shown in FIG. 3, or may define the entire distance traveled by the interferometer signal components 312, 314 between the splitter 310 and the detectors 340, 350. The optical paths 313, 315 may include an optical medium through which the signals travel. For example, the optical paths 313, 315 may include air or glass. The optical properties of the medium in the optical paths 313, 315 affect the amount of time that it takes the signals 312, 314 to travel in the optical paths 313, 315.

From the mirrors 320 and 322, the respective interferometer signal components 312 and 314 are provided to another splitter 330, where the signal is further split into a pair of signals which are received by two or more detectors 340, 350.

If the optical paths 313, 315 (or other optical paths not pictured) are identical in length and other properties, then the sample beam 312 and the reference beam 314 arrive at the detectors 340, 350 at the same time. However, by varying one or more of the optical paths 313, 315 with respect to the other, a time delay can be introduced, as shown in FIG. 4.

Figure 4:
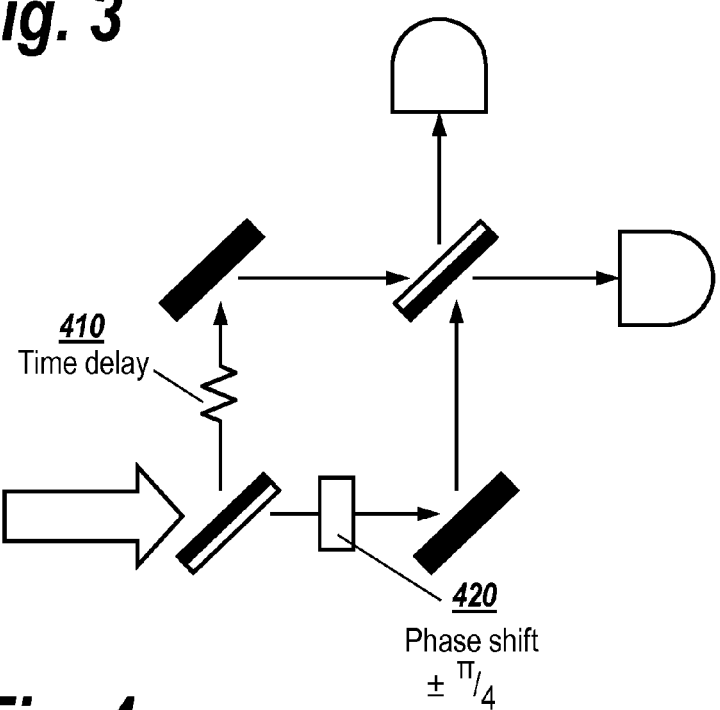
FIG. 4 depicts an interferometer having two optical paths and a time delay between the optical paths

As depicted in FIG. 4, each interferometer 116, 118 may be unbalanced in that each interferometer has a time delay 410 (often referred to by the symbol "$\tau$"), which in some situations may be equal to the symbol period (e.g., 50 ps for a 20 Gsymbol/s line rate) of the data modulation rate, in one optical path 313 relative to that of the other optical path 315. The time delay 410 affects the time at which each respective beam 312, 314 is received at the detectors 340, 350.

One "symbol period" is often used as the time delay 410 value in interferometers. More specifically, using quadrature phase shift keying, the phase of a signal may be shifted in four different ways (by 0, $\pi/2$, $\pi$, and $3\pi/2$). Accordingly, each phase shift can encode a signal having two bits of information (e.g., "00," "01," "10," "11"). The symbol rate refers to the rate at which these "symbols" are transmitted in the network (e.g., the number of symbol changes made to the transmission medium per second), while the symbol period refers to the amount of time that it takes for a single symbol to be transmitted. For example, if it takes 46.5 ps (i.e., $4.65\times10^{-11}$ seconds) to transmit a single symbol, then the symbol period is 46.5 ps and the symbol rate is approximately $2.15\times10^{10}$ symbols per second (or 21.5 Gsymbol/s).

Conventional interferometers include a time delay 410 in order to determine the amount that a particular signal has been phase shifted. Conventionally, the time delay 410 may be set to (for example) one symbol period in order to aid in the interpretation of the phase shifted signal.

However, the inventors have discovered that, unexpectedly, the time delay 410 may also be leveraged to reduce the cross-talk penalty associated with cross-phase modulation in the modulated signal. More specifically, by selecting a time delay value appropriate to the amount of dispersion and/or predispersion in the network, the cross-talk penalty can be significantly reduced.

The time delay 410, may be introduced by making the optical path length of the two optical paths 313, 315 different, or may be introduced by varying the medium through which one of the signals 312, 314 travels, among other things. For ease of fabrication, the time delay 410 may be introduced by making the physical length of the interferometer's 116 optical path 313 longer than the physical length of the other optical path 315.

Each interferometer 116, 118 is respectively set to impart a relative phase shift 420 of $\pi/4$ and $-\pi/4$ by the application of an appropriate voltage to electrodes on the shorter optical path 315. A more detailed description of the interferometers and time delay can be found in U.S. patent application Ser. No. 10/451,464, the contents of which are incorporated herein by reference.

As noted above, a modulated signal may suffer from cross-phase modulation (XPM), in which the phase of one component signal in the modulated signal interferes with the phase of another component signal in the modulated signal. Whereas a conventional system might constantly apply a one-symbol delay 410, a sub-symbol period delay may be used by DMPSK systems (such as DQPSK systems) to improve tolerance to dispersion and filtering.

Indeed, the XPM penalty can be significantly reduced by using a delay that is less than the symbol period for the DQPSK signals. In modeled systems (see, e.g., U.S. Provisional Patent Application Ser. No. 61/252,374, the contents of which are incorporated herein by reference), the penalty may be reduced by up to 5 dB when the XPM penalty is at its greatest and more than 1 dB when using typical parameters. This is a quite significant reduction and may make the use of partial DQPSK receivers a preferred choice for upgrade systems.

In order to achieve these benefits, the interferometer 116 depicted in FIG. 4 may be configured so that the time delay 410 is set to a value to reduce the cross-talk penalty. To achieve this, a cross-talk penalty may be determined, and a delay value for the time delay 410 may be determined based on the cross-talk penalty. The cross-talk penalty may be represented, for example, by an optical signal to noise ratio (OSNR).

The inventors have determined that the cross-talk penalty varies significantly with both average dispersion and with the amount of pre-dispersion. The average dispersion may, in turn, be affected by the variability in the span lengths between nodes in the network. These aspects of the cross-talk penalty will be described in more detail below with respect to FIGS. 6-10B.

In brief, the cross-talk penalty may arise due to cross phase modulation when DQPSK channels are transmitted alongside on/off keyed channels; that is, the XPM can introduce a cross-talk penalty. The cross talk penalty may be affected by the average residual dispersion per span in the network. The residual dispersion per span is the sum of the fiber dispersion for a given span minus the sum of the dispersion compensating module per span.

When the residual dispersion per span is minimal, the cross-talk penalty may be large. By introducing randomness (or irregularity) into the span length, the average residual dispersion per span can be increased, which results in a per-span compensation factor. As a result, when the spans are of substantially equal, regular lengths, the residual dispersion per span is low and the cross-talk penalty is large. When the span lengths are irregular or random, the residual dispersion per span is higher, and the cross-talk penalty is reduced.

Unexpectedly, the inventors have found that the time delay 410 may be used to compensate for the cross-talk penalty. The inventors have found that a sub-symbol period delay is useful when the cross-talk penalty is large, and the amount of the delay can be optimized based on the amount of the penalty. Accordingly, the methods described herein account for the cross-talk penalty and compensate by introducing a time delay 410 which is set based on the cross-talk penalty in order to account for the cross-talk penalty.

By reducing the amount of the time delay 410 (or by increasing the free spectral range) used to demodulate DQPSK signals, it is possible to substantially reduce the cross-talk penalties caused, for example, by transmitting the DQPSK channels alongside 10 Gb/s OOK channels on a 50 GHz grid. For optimized values of pre-dispersion, the improvement in required OSNR can be more than 1 dB. When the cross-talk penalty is significantly higher, greater improvements of up to 5 dB can be found. The delay may be dependent on the size of the cross-talk penalty. Thus, the delay used in the receiver has a direct impact on the cross-talk penalty.

In order to determine the cross-talk penalty, a dispersion map of the network may be used. A dispersion map describes the chromatic dispersion in the network as a function of distance. A dispersion map may be represented, for example, as a geographical map having contour lines indicating the relative dispersion in the network as a function of distance from a source. For example, the dispersion map may describe the lengths of one or more of the plurality of fiber spans, and/or may describe the variability in the lengths of two or more fiber spans. The cross-talk penalty may be calculated based on the dispersion map; for example based on the lengths of two or more of the fiber spans, or based on the variability between the fiber spans, or based on the amount of dispersion at a certain distance. The time delay value may be calculated to be larger as the lengths of the fiber spans become more irregular, in some embodiments approaching a pre-defined maximum time delay value, such as 1 symbol period.

The cross-talk penalty may be determined based at least in part on a residual dispersion per span associated with each of the plurality of fiber spans, or based on a residual dispersion per span in the network as a whole.

In one embodiment of the present invention, the cross-talk penalty may be determined, and an interferometer having a preset or predetermined time delay value 410 may be incorporated into a network at an appropriate location to compensate for the cross-talk penalty. In another embodiment, the time delay value 410 may be variable, rather than preset, so that the interferometer may be used in more than one context and/or may be adjusted as conditions in the network change. An interferometer having an adjustable time delay value 410 is depicted in FIG. 5.

Figure 5:
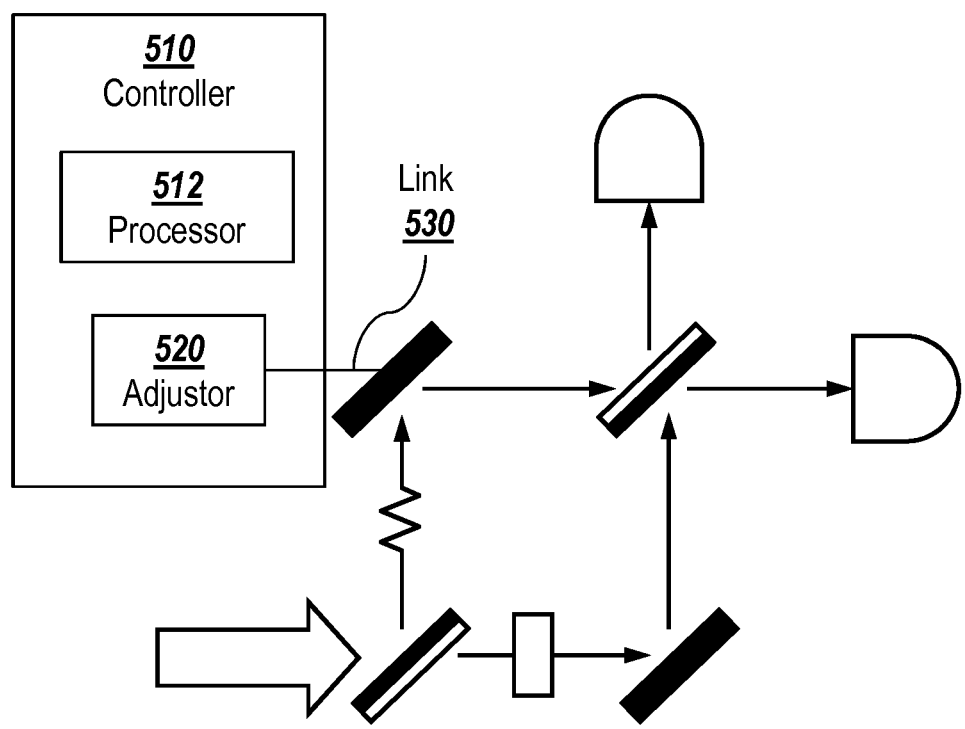
FIG. 5 depicts an interferometer having a variable time delay according to an exemplary embodiment.

As shown in FIG. 5, the interferometer 500 includes a controller 510 for controlling the length of the optical path 313. One of ordinary skill in the art will recognize that controlling the length of the optical path 313 is not the only way to vary the time delay 410, and thus the interferometer 500 of FIG. 5 is exemplary only. For example, the length of a different, or multiple, optical paths may be modified, or one or more optical properties of the optical path 313 may be modified. In one embodiment, the optical path 313 includes a medium which transmits light at different speeds depending on the properties of the medium. For example, the optical path 313 may include air and glass through which light travels at different speeds. By introducing or removing the glass to the optical path 313, or by modifying the properties of the glass, the speed at which the light travels may be modified.

The controller 510 of the interferometer 500 includes a processor 512 for calculating the cross-talk penalty associated with a particular span or spans in the network. For example, the processor 512 may receive a dispersion map and calculate an expected cross-talk penalty by consulting a table, database, or some form of lookup table of predetermined values. Alternatively, the processor 512 may build a dispersion map based on data that the processor 512 acquires from the network itself. For example, the processor 512 may instruct a communications device to "ping" nearby processors in order to determine the lengths between spans and, hence, calculate the span variability. The processor may consult a memory of the controller 510, such as a hard drive, ROM, RAM, or some other non-transitory device readable medium, to determine the appropriate cross-talk penalty and/or time delay associated with the network.

The processor 512 may also calculate a time delay value associated with the cross-talk penalty. The processor 512 may calculate the time delay value based on the cross-talk penalty and/or may consult a table or database storing predetermined time delay values and using the cross-talk penalty as an index key.

The processor 512 may be, for example, a microprocessor, a field programmable gate array (FPGA), an application-specific integrated circuit (ASIC), or any other suitable processor which can be programmed with instructions that, when executed, cause the processor to perform a task. The processor may or may not be directly integrated into the interferometer 500.

Once a time delay value is established, the processor 520 instructs an adjustor 520 to adjust the optical path 313 and/or the mirror 320 in order to achieve the determined time delay value. For example, the minor 320 may be connected to the adjustor 520 by a link 530 through which the adjustor 520 can manipulate the minor 320. The minor may be moved backwards or forwards along the optical path in order to achieve the determined time delay value. Note that it may also be necessary to adjust the angle of the mirror 320 or other minors 320 in the interferometer 500 so that the light reaches the intended target.

The adjustor 520 may be any suitable component or assembly capable of moving the minor 320, and can include, for example, a motor such as an electric motor.

FIGS. 6-10B provide information relating to the calculation of suitable delays for reducing a cross-talk penalty. As used in FIGS. 6-10B, predispersion refers to any dispersion (fiber or module) introduced at the transmitter prior to a signal on an optical fiber, and any dispersion compensating modules which constitute the dispersion map. "Nett dispersion" refers to the total sum of the dispersions of fiber(s) and dispersion compensating module(s) summed over all spans, plus any post compensator located prior to the receiver. Nett dispersion is typically at or very near to zero.

The network parameters for the results shown in FIGS. 6-10B are as follows. The SMF fiber loss was 0.22 dB/km with the total span loss fixed at 19.8 dB by adding an extra loss at the input to the EDFA. The DCMs were fixed to give the required average dispersion for an 80 km span. Average dispersions of 0.23, 0.3, 0.5 and 1.0 ps/nm/km were used. The dual stage EDFAs had net gain of 19.8 dB and a net noise figure of 5.5 dB. The channel powers for both the OOK channels and the DQPSK channel were set at 0 dBm. The channels were filtered with a 0.3 nm filter at the transmitter and with a variable filter at the receiver. The delay of the Mach-Zehnder modulator at the receiver was also optimized; however the same delay was used for both the I and Q channels.

The performance was assessed by finding the required OSNR to give a bit error rate of $2\times10^{-3}$ for the DQPSK channel. To do this the chosen system was modeled using a higher order split step Fourier method and then additional noise was added to the signal at the receiver to degrade the BER to 2×10-3. The post dispersion for the DQPSK channel was optimized to give the best performance, so there is no dispersion penalty in the results. For back-to-back performance the OSNR for a $2\times10^{-3}$ error rate is 12 dB referenced to a 0.1 nm bandwidth.

Figure 6:
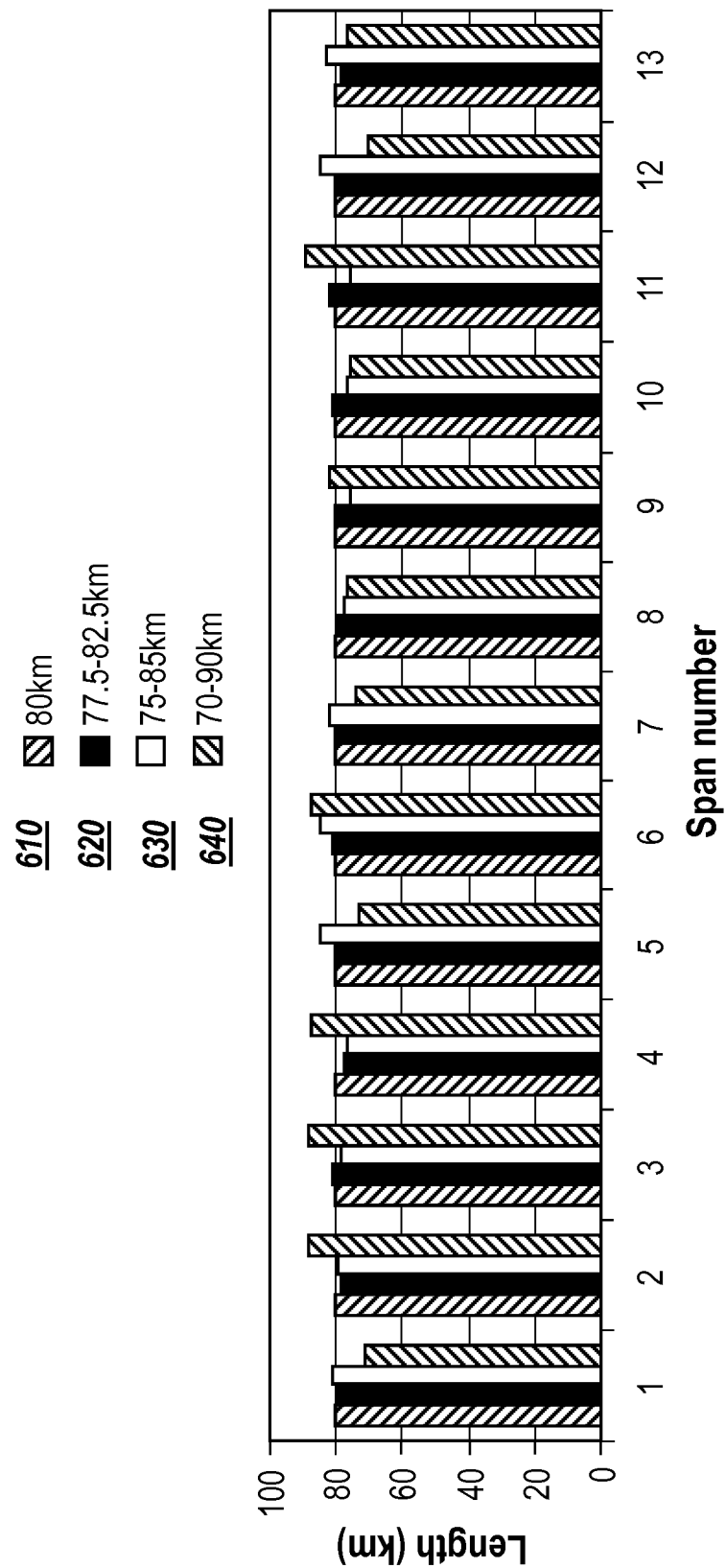
FIG. 6 depicts four exemplary communications networks having different variability in the span lengths.

FIG. 6 describes four exemplary communications networks 610, 620, 630, 640 having different variability in the span lengths. As shown in FIG. 6, each network includes 13 spans numbered 1-13, each span having a length between 70 and 90 km. Network 610 is the most regular, having all spans of length 80 km (and therefore a σ value of +/−0 km). Network 640 is the most irregular, having that may vary by as much as 20 km in length and therefore having a σ value of +/−10 km.

Figure 7A:
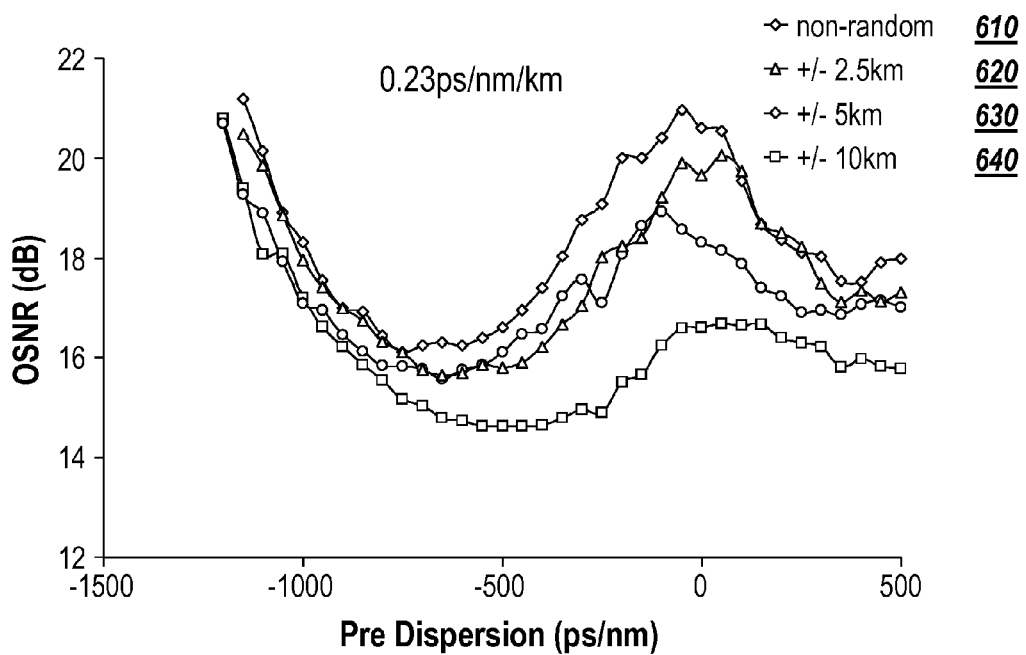
FIG. 7A depicts the optical signal to noise ratio in a network having a dispersion value of 0.23 ps/nm/km as a function of the amount of predispersion in an optical signal.
Figure 7B:
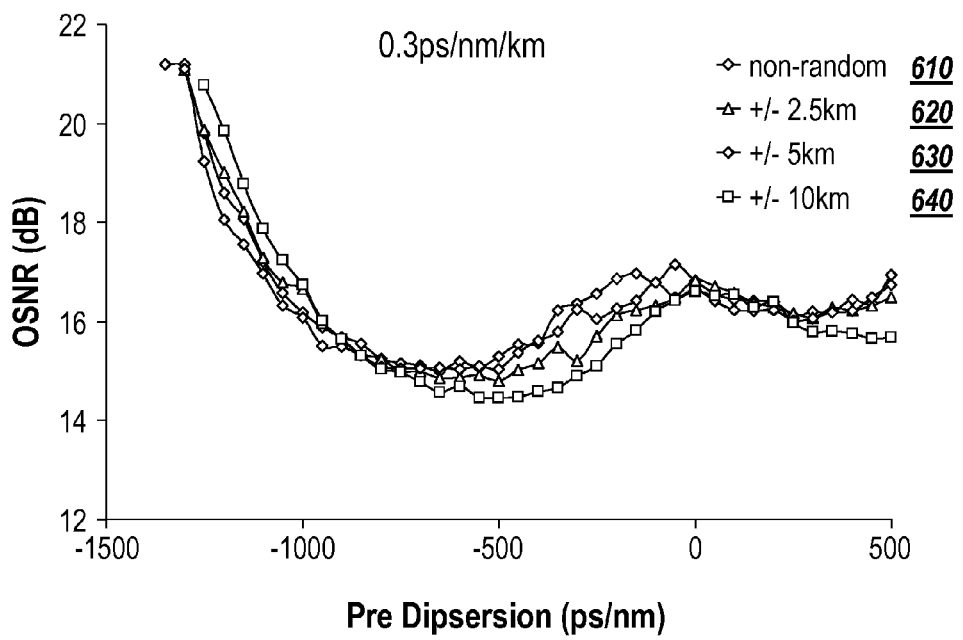
FIG. 7B depicts the optical signal to noise ratio in a network having a dispersion value of 0.3 ps/nm/km as a function of the amount of predispersion in an optical signal.
Figure 7C:
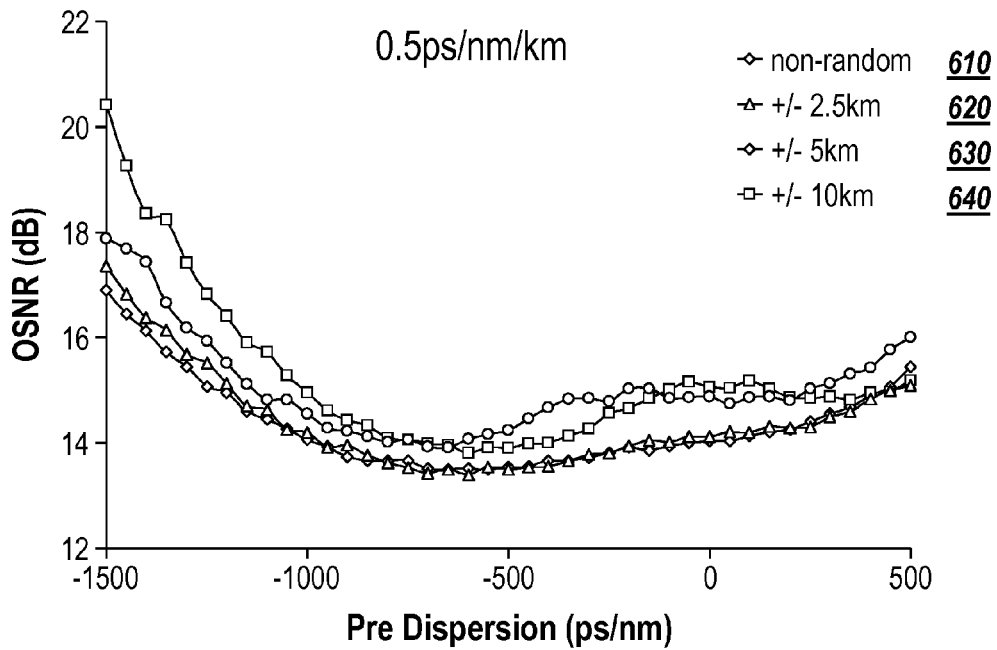
FIG. 7C depicts the optical signal to noise ratio in a network having a dispersion value of 0.5 ps/nm/km as a function of the amount of predispersion in an optical signal.
Figure 7D:
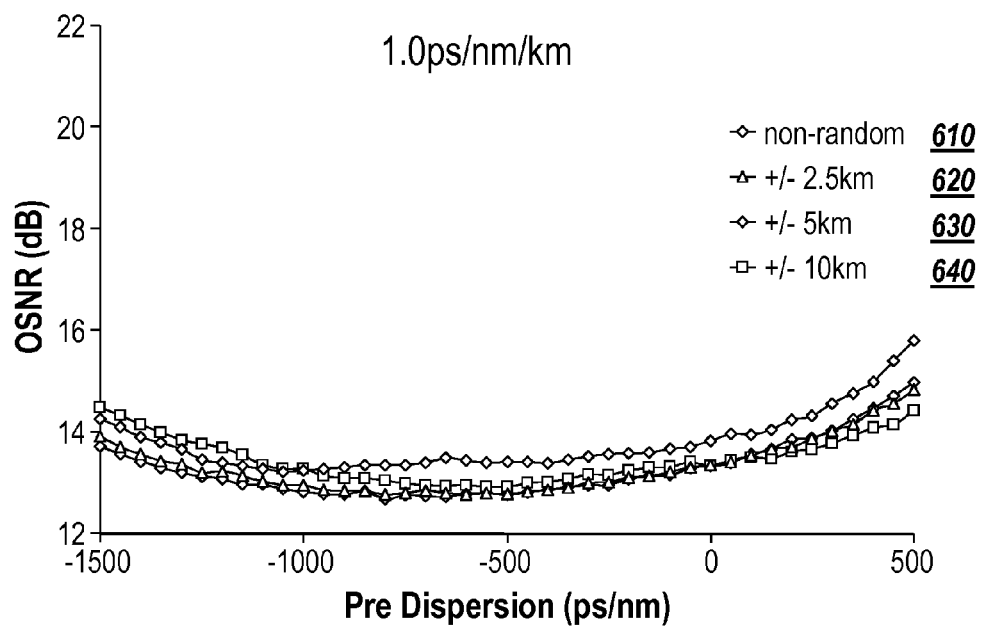
FIG. 7D depicts the optical signal to noise ratio in a network having a dispersion value of 1.0 ps/nm/km as a function of the amount of predispersion in an optical signal.

FIGS. 7A-7D depict the optical signal to noise ratio in each of the networks 610, 620, 630, 640 as a function of predispersion. FIG. 7A depicts the optical signal to noise ratio in a network having a dispersion value of 0.23 ps/nm/km as a function of the amount of predispersion in an optical signal. FIG. 7B depicts the optical signal to noise ratio in a network having a dispersion value of 0.3 ps/nm/km as a function of the amount of predispersion in an optical signal. FIG. 7C depicts the optical signal to noise ratio in a network having a dispersion value of 0.5 ps/nm/km as a function of the amount of predispersion in an optical signal. FIG. 7D depicts the optical signal to noise ratio in a network having a dispersion value of 1.0 ps/nm/km as a function of the amount of predispersion in an optical signal.

FIGS. 7A-7D each include the amount of predispersion applied to the signal on the x-axis. On the y-axis is the optical signal to noise ratio, represented in decibels. Generally, a higher value on the y-axis indicates a stronger signal (or more informational signal as compared to noise introduced to the signal by the time the signal is received). For the different dispersion amounts (i.e., 0.23 ps/nm/km, 0.3 ps/nm/km, 0.5 ps/nm/km, and 1.0 ps/nm/km), the performance of each type of network 610, 620, 630, 640 is represented by the signal to noise ratio.

FIGS. 7A-7D show, for each type of network and predetermined amounts of dispersion, optimal predispersion amounts to be applied to a signal in order to achieve the best signal-to-noise ratio. By comparing the various graphs, it can be seen that the signal to noise ratio is generally higher for non-random span lengths, as compared to more variable span lengths. However, it can also be seen that, for higher dispersion amounts (e.g., FIGS. 7C and 7D), the effect is less pronounced and the performance of each network 610, 620, 630, 640 is relatively similar to the other networks.

Thus, FIGS. 7A-7D show that, for lower amounts of dispersion, the variability in span lengths affects the signal to noise ratio to a greater degree. That is, under high amounts of dispersion, the different networks perform in similar ways. Thus, for a network with a relatively low amount of dispersion, there is more room to affect the OSNR by, e.g., varying the span lengths or introducing a sub-symbol rate delay.

Figure 8:
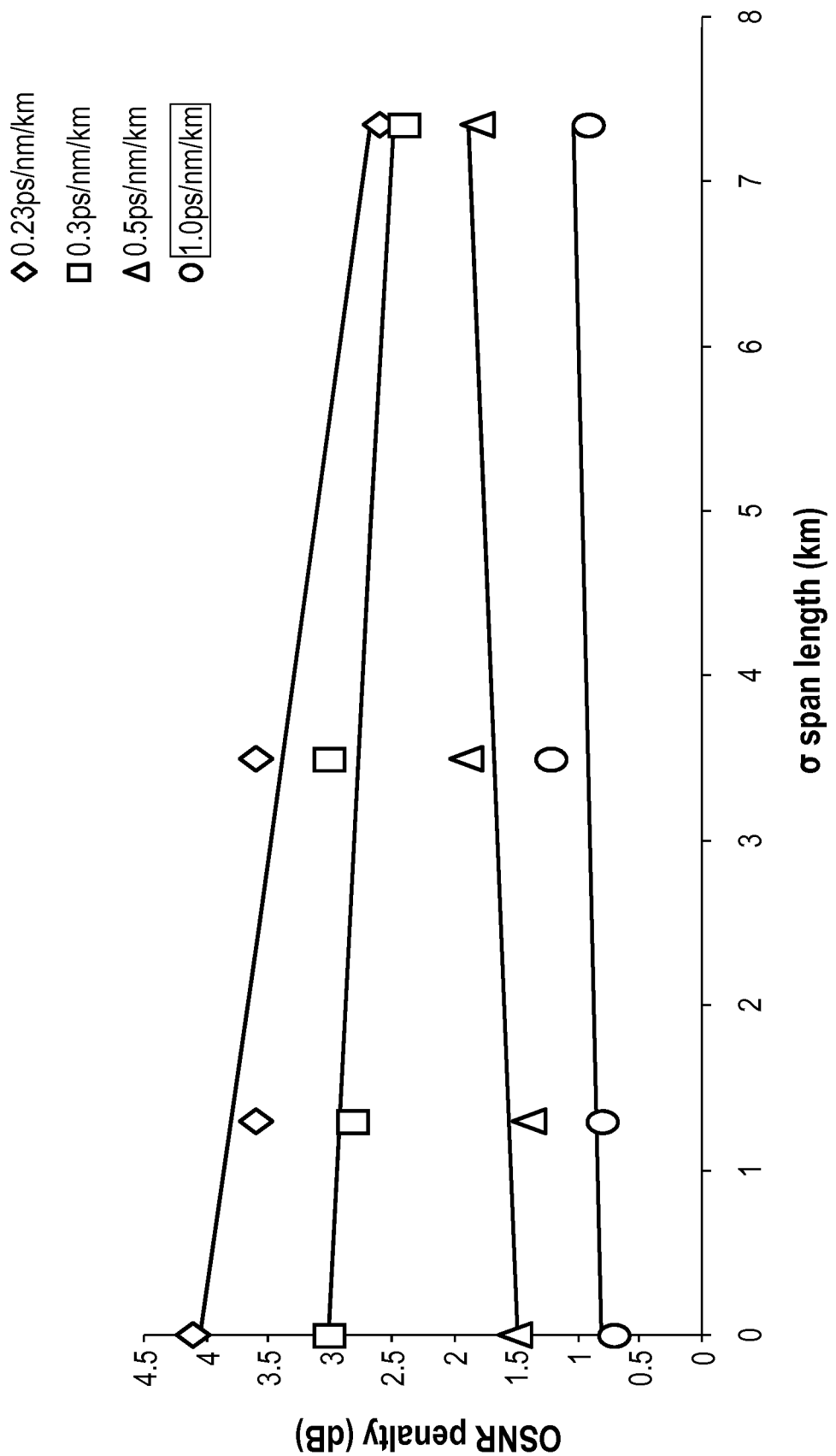
FIG. 8 depicts the optical signal to noise ratio penalty for signals in a communications network as a function of the variability in the span length in the network.

FIG. 8 depicts an OSNR penalty for signals in a communications network as a function of the variability in the span length in the network. In FIG. 8, the OSNR penalty may represent a cross-talk penalty, as measured by the signal to noise ratio, resulting from XPM. As can be seen in FIG. 8, the optical signal to noise ratio (OSNR) penalty generally decreases as the span lengths become more irregular. For lower dispersion values (e.g., 0.23 ps/nm/km), the effect of increasing span length variability is more pronounced. At higher dispersion values (e.g., 1.0 ps/nm/km), the effect is reduced. As can be seen in FIG. 8, with higher average dispersion, the XPM penalties and therefore the extent to which they can be mitigated are significantly reduced.

FIGS. 6-8 show the effects of dispersion, predispersion, and span irregularity on the OSNR and OSNR penalty for a signal in the network. FIGS. 9A-10B depict the results of introducing a variable symbol delay to the interferometers.

Figure 9A:
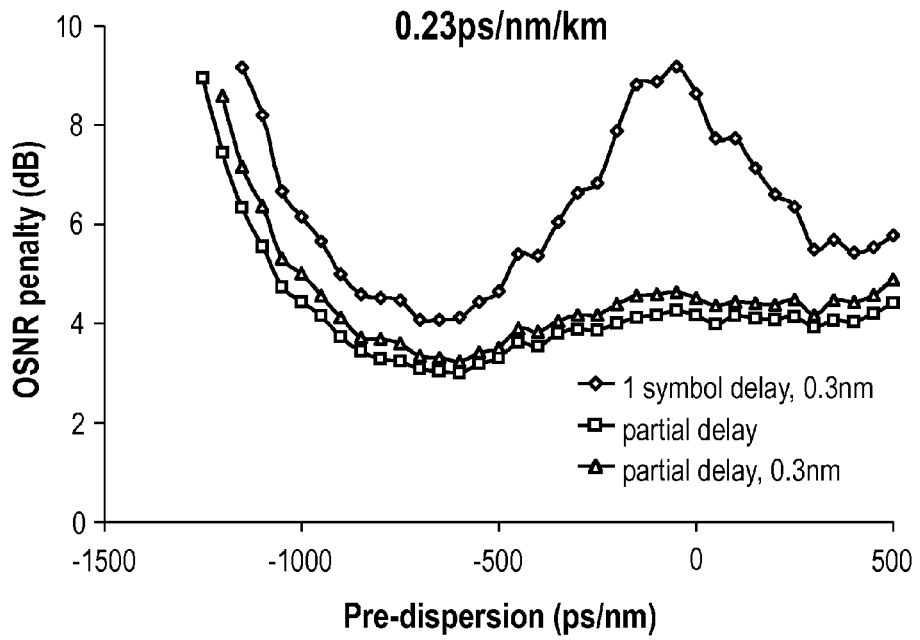
FIG. 9A depicts the optical signal to noise ratio in a network having a dispersion value of 0.23 ps/nm/km as a function of the amount of predispersion in an optical signal for different time delay values.
Figure 9B:
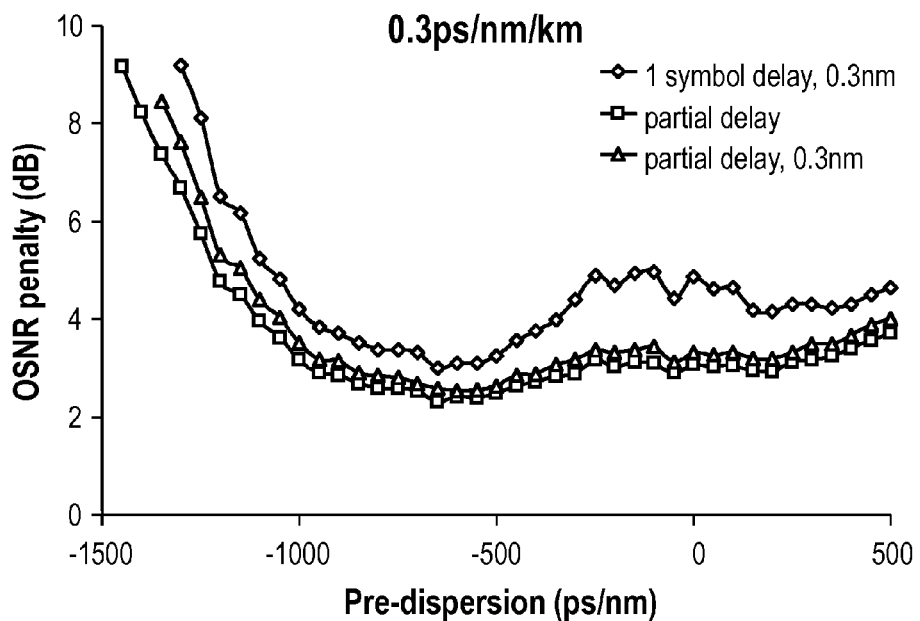
FIG. 9B depicts the optical signal to noise ratio in a network having a dispersion value of 0.3 ps/nm/km as a function of the amount of predispersion in an optical signal for different time delay values

FIG. 9A depicts the optical signal to noise ratio in a network having a dispersion value of 0.23 ps/nm/km as a function of the amount of predispersion in an optical signal for different time delay values. FIG. 9B depicts the optical signal to noise ratio in a network having a dispersion value of 0.3 ps/nm/km as a function of the amount of predispersion in an optical signal for different time delay values.

Along the x-axis in FIGS. 9A and 9B are plotted different pre-dispersion amounts, while the y-axis describes the OSNR penalty (in this case representing a penalty resulting from XPM) as a function of the pre-dispersion. FIGS. 9A-9B thus show the effects of varying the predispersion amount on the OSNR penalty.

As shown in FIG. 9A, for the optimum pre-dispersion (around −600 ps/nm) there is a 1.1 dB improvement in OSNR penalty when both the delay and the filter bandwidth (in one example, 0.3 nm) are varied to give the best performance. If only the delay is changed, then the improvement in OSNR penalty is reduced to 0.9 dB. Therefore, it is clear that the improved performance is substantially a result of the reduced delay. For the pre-dispersion where the XPM penalty is greatest, there is a far more significant reduction in penalty. By varying both the delay and the bandwidth, is it possible to obtain a 5 dB reduction in OSNR penalty; if only the delay is varied the improvement is slightly reduced (to 4.6 dB).

As noted above, with higher average dispersion, the XPM penalties and therefore the extent to which they can be mitigated are significantly reduced. This can be seen in the graph for a dispersion value of 0.3 ps/nm/km shown in FIG. 9B, where the improvement for the lowest OSNR penalty is reduced to 0.7 dB. With higher average dispersion of 0.5 ps/nm/km and 1.0 ps/nm/km improvement from using an optimized delay is further reduced to 0.3 dB. However, for high average dispersions there is very little penalty from XPM (<1 dB) and so limited scope for improved performance.

Figure 10A:
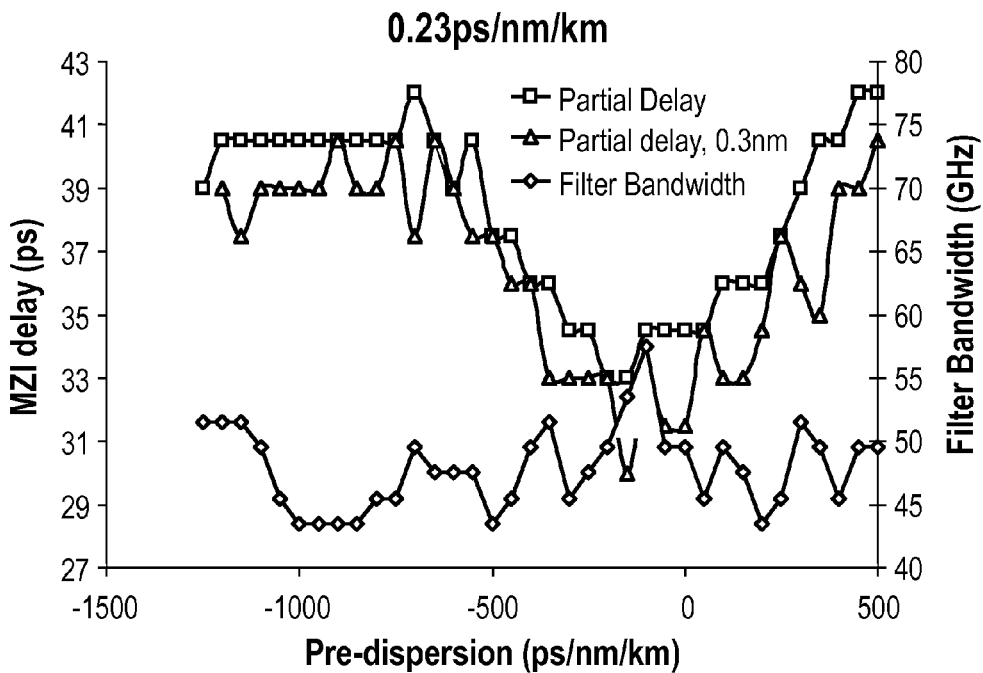
FIG. 10A depicts exemplary interferometer delay values in a network having a dispersion value of 0.23 ps/nm/km as a function of the amount of predispersion in an optical signal for different time delay values
Figure 10B:
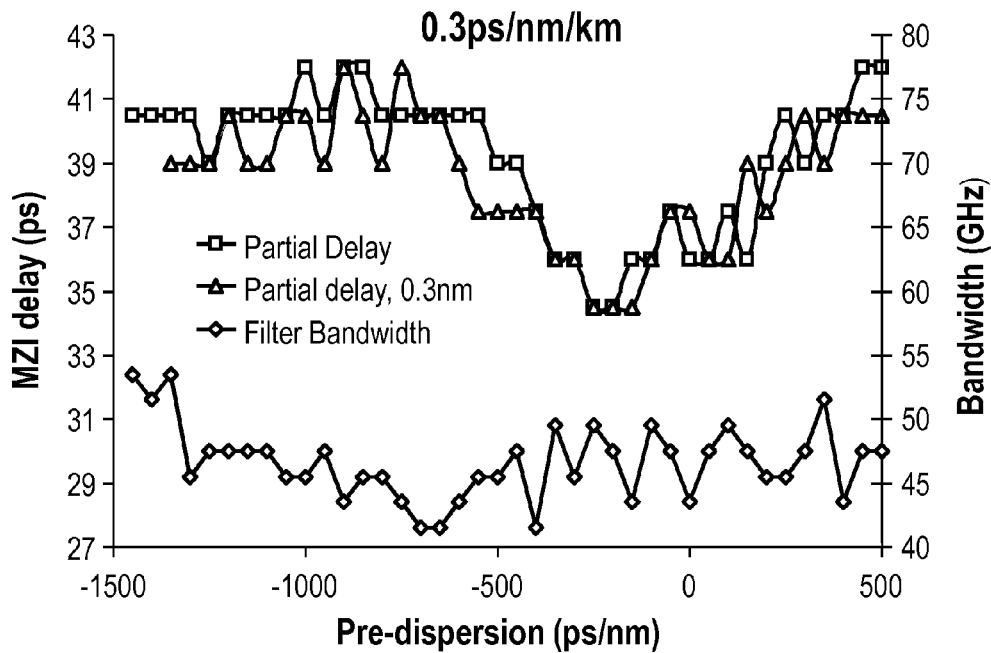
FIG. 10B depicts exemplary interferometer delay values in a network having a dispersion value of 0.3 ps/nm/km as a function of the amount of predispersion in an optical signal for different time delay values

FIG. 10A depicts exemplary interferometer delay values in a network having a dispersion value of 0.23 ps/nm/km as a function of the amount of predispersion in an optical signal for different time delay values, determined based on the data from FIG. 9A. FIG. 10B depicts exemplary interferometer delay values in a network having a dispersion value of 0.3 ps/nm/km as a function of the amount of predispersion in an optical signal for different time delay values, determined based on the data from FIG. 9B.

At the data rate used in FIGS. 10A and 10B, a 1 symbol, standard delay would be 46.5 ps. A suitable delay value for reducing a cross-talk penalty as shown in FIGS. 10A and 10B is ~41 ps (88% of the symbol period) when the XPM penalty is at its smallest. However where the penalty is greater the suitable delay is reduced. In the case of 0.23 ps/nm/km the delay goes down to 31 ps (67% of the symbol period) while for 0.3 ps/nm/km the delay is ~35 ps (75% or a symbol period). This again indicates that reducing the delay of the demodulator is having a large effect on the size of the XPM penalty and that the improvement seen is directly related to the XPM penalty.

The optimum value for the delay is not strongly affected by the filter bandwidth, although there is a trend for the delay to be slightly smaller when the narrower, non-optimum filter bandwidth is used. This is consistent with what has been found with partial DPSK. The optimum filter bandwidth itself does not show any significant trend that varies with the size of the XPM penalty. It varies around 45 GHz (0.36 nm) but does not demonstrate a noticeable variation with the size of the XPM penalty.

Figure 11:
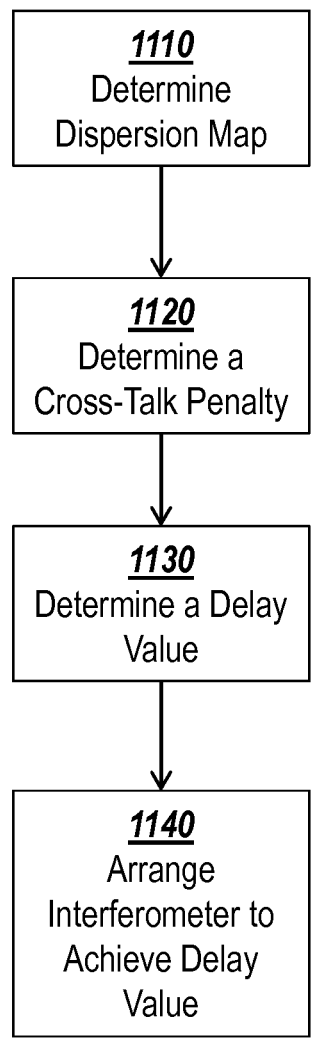
FIG. 11 is a flowchart depicting an exemplary method performed in a communications network.

FIG. 11 is a flowchart depicting an exemplary method performed in a communications network. The network may transmit one or more modulated signals. In some embodiments the modulated signals may include DMPSK signals (such as a DQPSK signal), and/or OOK signals.

At step 1110, a dispersion map of the network may optionally be determined. The dispersion map may be represented, for example, as a geographical map having contour lines indicating the relative dispersion in the network as a function of distance from a source. For example, the dispersion map may describe the lengths of one or more of the plurality of fiber spans, and/or may describe the variability in the lengths of two or more fiber spans.

At step 1120, a cross-talk penalty representing the degradation of the optical signal as a result of cross-phase modulation may be determined. In one embodiment, the cross-talk penalty may be calculated based on the dispersion map; for example based on the lengths of two or more of the fiber spans, or based on the variability between the fiber spans, or based on the amount of dispersion at a certain distance. The cross-talk penalty may be determined based at least in part on a residual dispersion per span associated with each of the plurality of fiber spans, or based on an average residual dispersion per span in the network as a whole. In some embodiments, the cross-talk penalty may be determined based on a Nett dispersion in the network or a portion of the network.

The cross-talk penalty may take into account a number of factors. For example, if a signal in the network is subject to predispersion, the cross-talk penalty may use the amount of pre-dispersion in the optical signal as a factor. The cross-talk penalty may be determined by modeling the network using computer software, or may be measured directly by determining an OSNR and/or OSNR penalty in the network.

At step 1130, a delay value may be determined based on the determined cross-talk penalty. For example, the delay value may be determined to be a value that compensates for the cross-talk penalty. As the cross-talk penalty becomes larger, the delay value may be set appropriately (e.g., by reducing the amount of the delay) in order to compensate for the cross-talk penalty. The delay value may be determined to increase, for example as the lengths of the fiber spans become more irregular. The delay value may approach a predetermined default value, such as a 1 symbol period delay. The inventors expect that, using the exemplary embodiments described herein, the delay value will typically be below 1 symbol period.

Note that the time delay values need not necessarily be an amount of time (e.g., 1 ps), but may also be a distance to which one or more of the optical paths in the interferometer must be set in order to achieve a particular time delay.

It should be noted that, in some embodiments, the amount of pre-dispersion may be calculated but not factored into the cross-talk penalty. In such an embodiment, the amount of predispersion may be used as a separate factor in determining the delay value.

At step 1140, the interferometer may be arranged to achieve the determined delay value. In some embodiments, an interferometer having an appropriate, predetermined or preset time delay in an optical path of the interferometer is selected and deployed in the network. In another embodiment, the interferometer may have a variable delay, such as in the interferometer in FIG. 5, and the variable delay may be set so as to establish the determined delay value. For example, the variable delay may be modified by adjusting a length of one or more of the optical paths of the interferometer relative to each other. In another embodiment, adjusting the variable delay may involve adjusting a parameter of the optical path, such as the type of medium in the optical path or the properties of the medium.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, a computing device (e.g., a workstation) or a user of a computing device, unless otherwise stated.

The scope of the invention is defined by the claims and their equivalents.

The invention claimed is:

1. A method of deploying an optical demodulator arrangement having at least one interferometer in a network that transmits an optical signal comprising a plurality of channels, the network comprising a plurality of fiber spans, each of the plurality of fiber spans having a length, and wherein the interferometer has a first optical path and a second optical path and a time delay is formed between the first and second optical paths, the method comprising:
   determining a dispersion map of the network;
   determining a cross-talk penalty that results from cross-phase modulation between the plurality of channels, wherein the cross-talk penalty is based at least in part on the dispersion map; and
   determining a time delay value for the interferometer, wherein the time delay value is determined based at least in part on the cross-talk penalty.

2. The method of claim 1, further comprising the step of adjusting a parameter of an optical path of one or more of the first and second optical paths of the interferometer.

3. The method of claim 1, wherein the dispersion map includes the lengths of one or more of the plurality of fiber spans.

4. The method of claim 1, wherein the dispersion map includes the variability in lengths of two or more fiber spans of the plurality of fiber spans.

5. The method of claim 1, wherein the step of determining the cross-talk penalty comprises determining the cross-talk penalty based at least in part on the lengths of two or more fiber spans of said plurality of fiber spans.

6. The method of claim 1, wherein the time delay value increases as the lengths of the fiber spans become more irregular.

7. The method of claim 1, wherein the step of determining the cross-talk penalty comprises determining the cross-talk penalty based at least in part on a residual dispersion per span associated with each of the plurality of fiber spans.

8. The method of claim 1, wherein the step of determining the cross-talk penalty comprises determining the cross-talk penalty based at least in part on a residual dispersion per span of the network.

9. The method of claim 1, wherein one of said plurality of channels is a Differential M-ary Phase Shift Keyed (DMPSK) channel.

10. The method of claim 9, wherein the DMPSK channel is a Differential Quadrature Phase Shift Keyed (DQPSK) channel.

11. The method of claim 9, wherein a second one of said plurality of channels is a neighboring channel of the DQPSK channel, and the neighboring channel is an on/off keyed (OOK) channel.

12. The method of claim 1, wherein the cross-talk penalty includes at least an amount of pre-dispersion in the optical signal.

13. The method of claim 1, further comprising determining the amount of pre-dispersion in the optical signal, and wherein the step of determining the time delay value comprises determining the time delay based at least in part on the amount of pre-dispersion in the optical signal.

14. The method of claim 1, further comprising adjusting a length of one or more of the first and second optical paths relative to each other of the interferometer to adjust the time delay value therebetween.

15. An optical demodulator arrangement for demodulating a modulated optical signal, the optical signal transmitted in a network comprising a plurality of fiber spans, each of the plurality of fiber spans having a length, the optical demodulator arrangement comprising:
   a splitter for splitting the modulated optical signal into first and second signal components,
   a first interferometer having first and second optical paths and being coupled to receive the first signal component, and
   a second interferometer having first and second optical paths and being coupled to receive the second signal component,
   wherein each of said first and second interferometers has a time delay of less than one symbol period between the first and second optical paths, wherein a value of the time delay is determined based on at least a cross-talk penalty that results from cross-phase modulation in the modulated optical signal, and wherein the cross-talk penalty is based at least in part on a dispersion map.

16. The optical demodulator arrangement of claim 15, wherein at least one of the first and second interferometers comprises a phase shifter located on one of the first and second optical paths for shifting the phase of the corresponding signal component.

17. The demodulator arrangement of claim 15, wherein one of said first and second interferometers has a relative phase shift of π/4 radians between the two optical paths and the other of said first and second interferometers has a relative phase shift of π/4 radians between the two optical paths.

18. The optical demodulator arrangement of claim 15, further comprising at least one detector coupled to at least one output signal of each of the first and second interferometers.

19. The optical demodulator arrangement of claim 15, further comprising a processor for determining the value of the time delay.

20. The optical demodulator arrangement of claim 15, wherein the time delay between the first and second optical paths is variable.

21. The demodulator arrangement of claim 15, wherein the modulated optical signal comprises a Differential Quadrature Phase Shift Keyed (DQPSK) signal.

22. The demodulator arrangement of claim 21, wherein the modulated optical signal further comprises a neighboring signal to the DQPSK signal, and the neighboring signal is an on/off keyed (OOK) signal.

23. The demodulator arrangement of claim 15, further comprising first and second balanced detectors for receiving the respective outputs of the first and second interferometers.

24. An optical demodulator arrangement for demodulating a modulated optical signal, the optical signal transmitted in a network comprising a plurality of fiber spans, each of the plurality of fiber spans having a length, the optical demodulator comprising:
a splitter for splitting the modulated optical signal into first and second components;
a processor programmed with instructions, the instructions when executed causing the processor to determine:
a dispersion map of the network,
a cross-talk penalty arising from a cross-phase modulation in the modulated optical signal, the dispersion map used to determine the cross-talk penalty, and
a delay value determined based on the cross-talk penalty;
a first interferometer coupled to receive the first component, having first and second optical paths and first and second outputs;
a second interferometer coupled to receive the second component, having first and second optical paths and first and second outputs.

25. The demodulator arrangement of claim 24, wherein the first and second interferometers each have a variable time delay between the two optical paths, and the variable time delay is set to correspond to the determined delay value.

26. The demodulator arrangement of claim 25, further comprising an adjustor for changing the variable time delay.

27. The demodulator arrangement of claim 24, wherein the modulated optical signal comprises a Differential Quadrature Phase Shift Keyed (DQPSK) signal.

28. The demodulator arrangement of claim 27, wherein the modulated optical signal further comprises a neighboring signal of the DQPSK signal, and the neighboring signal is an on/off keyed (OOK) signal.

29. The demodulator arrangement of claim 24, further comprising one or more phase shifters coupled to at least one of the optical paths of the first or second interferometer, the phase shifters shifting the phase of the corresponding signal component.

30. The demodulator arrangement of claim 29, wherein one of said first and second interferometers has a relative phase shift of π/4 radians between the two optical paths and the other of said first and second interferometers has a relative phase shift of π/4 radians between the two optical paths.

31. The demodulator arrangement of claim 24, further comprising first and second balanced detectors for receiving the respective outputs of the first and second interferometers.

32. The demodulator arrangement of claim 24, wherein the cross-talk penalty is determined based on the variability in the lengths of the fiber spans in the network.

33. The demodulator arrangement of claim 32, wherein the time delay value increases as the lengths of the fiber spans become more irregular.

34. The demodulator arrangement of claim 25, wherein the cross-talk penalty is determined based on a residual dispersion per span associated with the plurality of fiber spans.

35. The demodulator arrangement of claim 25, wherein the instructions further comprise instructions for determining the amount of pre-dispersion in the optical signal, and wherein the instructions for determining the time delay value comprise instructions for determining the time delay based at least in part on the amount of pre-dispersion in the optical signal.

* * * * *